United States Patent
Sims

(10) Patent No.: US 8,645,328 B2
(45) Date of Patent: Feb. 4, 2014

(54) SYSTEM AND METHOD FOR ARCHIVE VERIFICATION

(75) Inventor: Robert C. Sims, Round Rock, TX (US)

(73) Assignee: KIP CR P1 LP, New York, NY (US)

( * ) Notice: Subject to any disclaimer, the term of this patent is extended or adjusted under 35 U.S.C. 154(b) by 547 days.

(21) Appl. No.: 12/025,436

(22) Filed: Feb. 4, 2008

(65) Prior Publication Data

US 2009/0198737 A1 Aug. 6, 2009

(51) Int. Cl.
*G06F 7/00* (2006.01)

(52) U.S. Cl.
USPC ............. 707/665; 707/662; 714/48; 714/6.11

(58) Field of Classification Search
USPC ............................ 707/662, 665; 714/6.11, 48
See application file for complete search history.

(56) References Cited

U.S. PATENT DOCUMENTS

| | | | |
|---|---|---|---|
| 3,984,923 A | 10/1976 | Rawson et al. | |
| 4,754,345 A | 6/1988 | Karlstetter | |
| 4,932,826 A | 6/1990 | Moy et al. | |
| 4,958,235 A | 9/1990 | Sims et al. | |
| 5,309,768 A | 5/1994 | Mathews et al. | |
| 5,386,324 A | 1/1995 | Fry et al. | |
| 5,668,800 A | 9/1997 | Stevenson | |
| 5,781,703 A | 7/1998 | Desai et al. | |
| 5,883,864 A | 3/1999 | Saliba | |
| 6,052,264 A * | 4/2000 | Curtis ........................... | 360/137 |
| 6,052,341 A | 4/2000 | Bingham et al. | |
| 6,163,853 A | 12/2000 | Findlay et al. | |
| 6,269,330 B1 | 7/2001 | Cidon et al. | |
| 6,304,880 B1 | 10/2001 | Kishi | |
| 6,490,253 B1 | 12/2002 | Miller et al. | |
| 6,715,031 B2 | 3/2004 | Camble et al. | |
| 6,725,394 B1 | 4/2004 | Bolt | |
| 6,799,156 B1 | 9/2004 | Rieschl et al. | |
| 6,823,401 B2 | 11/2004 | Feather, Jr. et al. | |
| 6,839,824 B2 | 1/2005 | Camble et al. | |
| 6,950,871 B1 | 9/2005 | Honma et al. | |
| 6,971,046 B1 | 11/2005 | Johnson et al. | |
| 7,076,391 B1 | 7/2006 | Pakzad et al. | |
| 7,200,546 B1 | 4/2007 | Nourmohamadian et al. | |
| 7,200,722 B2 | 4/2007 | Goodman | |
| 7,310,745 B2 | 12/2007 | Schnapp et al. | |
| 7,386,667 B2 | 6/2008 | Estelle et al. | |

(Continued)

FOREIGN PATENT DOCUMENTS

| | | |
|---|---|---|
| EP | 0726570 | 8/1996 |
| GB | 2419198 | 4/2006 |

OTHER PUBLICATIONS

"SCSI DDS Tape Expert Tool (mstm Online Help)," Hewlett Packard, 2002 <http://docs.hp.com/hpux/onlinedocs/onlinedocs/diag/stm/help/expert/scsi_ddsm.htm>.*

(Continued)

*Primary Examiner* — Cheyne Ly
(74) *Attorney, Agent, or Firm* — Sprinkle IP Law Group

(57) ABSTRACT

Embodiments provide systems and methods for archive verification of media in a library. A method of archive verification may comprise loading a specified media into a drive at intervals, sending one or more commands to the drive, wherein the drive attempts to read the specified media or data on the specified media in accordance with the one or more commands, collecting data associated with the specified media from the drive and determining the readability of the specified media or data on the specified media.

40 Claims, 6 Drawing Sheets

(56) References Cited

U.S. PATENT DOCUMENTS

| | | | |
|---|---|---|---|
| 7,443,801 B2 | 10/2008 | Neidhardt et al. | |
| 7,444,469 B2 | 10/2008 | Estelle et al. | |
| 7,483,810 B2 | 1/2009 | Jackson et al. | |
| 7,492,720 B2 | 2/2009 | Pruthi et al. | |
| 7,573,664 B2* | 8/2009 | Bentley et al. | 360/31 |
| 7,583,604 B2 | 9/2009 | Couturier | |
| 7,596,096 B2 | 9/2009 | Crawford et al. | |
| 7,627,786 B2 | 12/2009 | Bello et al. | |
| 7,653,840 B1 | 1/2010 | Taylor et al. | |
| 7,809,990 B2 | 10/2010 | Sasaki | |
| 7,885,805 B2 | 2/2011 | Dickens et al. | |
| 7,908,366 B2 | 3/2011 | Sims | |
| 7,971,006 B2 | 6/2011 | Justiss et al. | |
| 7,974,215 B1 | 7/2011 | Sims | |
| 8,035,911 B2 | 10/2011 | Ballard et al. | |
| 8,108,544 B2 | 1/2012 | Ramakrishnan et al. | |
| 8,145,572 B2 | 3/2012 | Ito | |
| 8,180,824 B2 | 5/2012 | McCoy et al. | |
| 8,195,986 B2* | 6/2012 | Meaney et al. | 714/48 |
| 2001/0039579 A1 | 11/2001 | Trcka et al. | |
| 2002/0006004 A1* | 1/2002 | Miyamura | 360/53 |
| 2002/0055999 A1 | 5/2002 | Takeda | |
| 2003/0070053 A1 | 4/2003 | Gallo et al. | |
| 2003/0097439 A1 | 5/2003 | Strayer et al. | |
| 2003/0126395 A1 | 7/2003 | Camble et al. | |
| 2003/0225865 A1 | 12/2003 | Koestler | |
| 2003/0233431 A1* | 12/2003 | Reddy et al. | 709/221 |
| 2004/0022263 A1 | 2/2004 | Zhao et al. | |
| 2004/0078697 A1 | 4/2004 | Duncan | |
| 2004/0139195 A1 | 7/2004 | Feather, Jr. et al. | |
| 2004/0139240 A1 | 7/2004 | DiCorpo et al. | |
| 2004/0168102 A1 | 8/2004 | Tsunoda | |
| 2005/0044451 A1 | 2/2005 | Fry et al. | |
| 2005/0076263 A1* | 4/2005 | Tomita | 714/6 |
| 2005/0091369 A1 | 4/2005 | Jones | |
| 2005/0138195 A1 | 6/2005 | Bono | |
| 2005/0149829 A1 | 7/2005 | Lee | |
| 2005/0174869 A1 | 8/2005 | Kottomtharayil et al. | |
| 2005/0210161 A1 | 9/2005 | Guignard et al. | |
| 2005/0231846 A1 | 10/2005 | Winarski et al. | |
| 2005/0246376 A1 | 11/2005 | Lu et al. | |
| 2005/0246509 A1* | 11/2005 | Topham et al. | 711/162 |
| 2005/0262231 A1 | 11/2005 | Lowe et al. | |
| 2006/0085595 A1 | 4/2006 | Slater | |
| 2006/0092850 A1 | 5/2006 | Neidhardt et al. | |
| 2006/0126211 A1 | 6/2006 | Sasaki | |
| 2006/0174071 A1 | 8/2006 | Justiss et al. | |
| 2006/0190205 A1* | 8/2006 | Klein et al. | 702/115 |
| 2006/0242489 A1* | 10/2006 | Brockway et al. | 714/718 |
| 2007/0025008 A1 | 2/2007 | Ballard | |
| 2007/0079048 A1 | 4/2007 | Starr et al. | |
| 2007/0106840 A1 | 5/2007 | Estelle | |
| 2007/0253088 A1 | 11/2007 | Clarke et al. | |
| 2007/0255920 A1 | 11/2007 | Gold | |
| 2007/0294591 A1 | 12/2007 | Usynin et al. | |
| 2008/0019283 A1 | 1/2008 | Emile | |
| 2008/0098168 A1 | 4/2008 | Estelle | |
| 2008/0109547 A1 | 5/2008 | Bao et al. | |
| 2008/0115015 A1 | 5/2008 | Ikezawa et al. | |
| 2008/0259809 A1 | 10/2008 | Stephan et al. | |
| 2008/0282265 A1 | 11/2008 | Foster et al. | |
| 2009/0044047 A1 | 2/2009 | Bates et al. | |
| 2009/0059757 A1 | 3/2009 | Haustein et al. | |
| 2009/0106816 A1 | 4/2009 | Ito | |
| 2009/0198650 A1 | 8/2009 | Sims | |
| 2009/0199045 A1 | 8/2009 | Kasubuchi et al. | |
| 2010/0023604 A1 | 1/2010 | Verma et al. | |
| 2010/0033863 A1 | 2/2010 | Fry et al. | |
| 2010/0125740 A1 | 5/2010 | Grechanik | |
| 2010/0182887 A1 | 7/2010 | Moody et al. | |
| 2010/0228805 A1 | 9/2010 | McCoy et al. | |
| 2011/0194451 A1 | 8/2011 | Sims | |
| 2012/0185589 A1 | 7/2012 | Sims | |
| 2012/0221597 A1 | 8/2012 | Sims | |

OTHER PUBLICATIONS

Weber (ed.) Information Technology—SCSI Primary Commands—4 (SPC-4), Project T10/1731-D, rev. 2, Sep. 15, 2005.
Penokie (ed.) Information Technology—SCSI Block Commands—3 (SBC-3), T10/1799-D, Rev. 6, Jul. 24, 2006.
Weber (ed.) Information Technology—SCSI Primary Commands—4 (SPC-4), Project T10/1731-D, rev. 10, Apr. 21, 2007.
International Search Report and Written Opinion for PCT Application No. PCT/US2009/032390, completed Jun. 26, 2009, mailed Jul. 3, 2009, 13 pgs.
Paul Boehler, "Common SCSI/ATAPI Command Set for Streaming Tape" QIC 157, Revision D, Dec. 13, 1995, 50 pgs.
Office Action issued in U.S. Appl. No. 12/024,755, mailed Jun. 23, 2010, 11 pgs.
Office Action issued in U.S. Appl. No. 12/025,322, mailed Jul. 8, 2010, 15 pgs.
Weber (ed.) Information Technology—SCSI Primary Commands—3 (SPC-3), Project T10/1416-D, rev. 22a, Mar. 25, 2005.
Oetting (ed.) Information Technology—SCSI Media Changer Commands—2 (SMC-2), INCITS T10 Project 1383D, rev. 7, Nov. 18, 2003.
International Search Report and Written Opinion mailed Aug. 29, 2008 for International Patent Application No. PCT/US2008/63227, 7 pgs.
International Search Report and Written Opinion mailed Jun. 29, 2009 for International Patent Application No. PCT/US2009/032402.
Office Action issued in U.S. Appl. No. 12/025,322, mailed Dec. 30, 2009, 11 pgs.
Notice of Allowance for U.S. Appl. No. 12/024,755, mailed Dec. 10, 2010, 16 pgs.
Office Action for U.S. Appl. No. 11/801,809, mailed Feb. 16, 2011, 23 pgs.
Notice of Allowance for U.S. Appl. No. 12/025,322, mailed Feb. 17, 2011, 8 pgs.
Office Action issued in U.S. Appl. No. 11/801,809, mailed Sep. 23, 2010, 31 pgs.
International Search Report and Written Opinion for International Patent Application No. PCT/US2011/021517, mailed Apr. 19, 2011, 12 pgs.
Office Action for U.S. Appl. No. 11/801,809, mailed Jun. 7, 2011, 16 pgs.
International Preliminary Report on Patentability (Ch. II) for International Patent Application No. PCT/US08/63227, mailed Oct. 31, 2011, Patent Cooperation Treaty, 25 pgs.
Corrected International Preliminary Report on Patentability (Ch. II) for International Patent Application No. PCT/US08/63227, mailed Feb. 2, 2012, Patent Cooperation Treaty, 22 pgs.
Office Action for U.S. Appl. No. 13/091,877, mailed Oct. 11, 2012, 14 pgs.
Office Action for U.S. Appl. No. 13/459,720, mailed Aug. 1, 2012, 16 pgs.
Office Action for U.S. Appl. No. 13/430,429, mailed Aug. 2, 2012, 15 pgs.
Office Action for U.S. Appl. No. 12/025,300, mailed Aug. 6, 2012, 30 pgs.
Office Action for U.S. Appl. No. 12/861,609, mailed Aug. 7, 2012, 10 pgs.
Office Action for U.S. Appl. No. 12/861,612, mailed Nov. 27, 2012, 12 pgs.
Office Action for U.S. Appl. No. 12/888,954, mailed Dec. 13, 2012, 14 pgs.
Office Action for U.S. Appl. No. 12/861,609, mailed Jan. 4, 2013, 12 pgs.
Notice of Allowance for U.S. Appl. No. 12/692,403, mailed Aug. 16, 2013, 3 pgs.
Notice of Allowance for U.S. Appl. No. 11/801,809, mailed Aug. 22, 2013, 5 pgs.
Office Action for U.S. Appl. No. 12/888,954, mailed Aug. 23, 2013, 16 pgs.
Notice of Allowance for U.S. Appl. No. 13/430,429, mailed Feb. 11, 2013, 6 pgs.
Notice of Allowance for U.S. Appl. No. 13/459,720, mailed Feb. 11, 2013, 6 pgs.

(56) References Cited

OTHER PUBLICATIONS

Office Action for U.S. Appl. No. 12/025,300, mailed Feb. 15, 2013, 35 pgs.
Office Action for U.S. Appl. No. 12/692,403, mailed Feb. 20, 2013, 35 pgs.
IBM et al., Hardware and Volume Statistical Analysis and Reporting System for Detecting and Isolating Media and Hardware Errors on the Magstar Family of Tape Drives, Dec. 1, 1999, 4 pgs (IP.com No. IPCOM000013086D).
International Preliminary Report on Patentability (Ch. I) for International Patent Application No. PCT/US2011/021517, mailed Aug. 2, 2012, 8 pgs.
Notice of Allowance for U.S. Appl. No. 13/091,877, mailed Feb. 27, 2013, 10 pgs.
Office Action for U.S. Appl. No. 11/801,809, mailed Mar. 27, 2013, 13 pgs.
Notice of Allowance for U.S. Appl. No. 13/459,720, mailed May 7, 2013, 2 pp.
Notice of Allowance for U.S. Appl. No. 13/430,429, mailed May 14, 2013, 4 pgs.
Notice of Allowance for U.S. Appl. No. 12/692,403, mailed May 14, 2013, 5 pgs.
Office Action for U.S. Appl. No. 12/861,609, mailed Sep. 6, 2013, 11 pgs.
Office Action for U.S. Appl. No. 12/025,300, mailed Jul. 30, 2013, 29 pgs.
Notice of Allowance for U.S. Appl. No. 13/430,429, mailed Aug. 1, 2013, 3 pgs.
Notice of Allowance for U.S. Appl. No. 13/459,720, mailed Aug. 5, 2013, 3 pgs.
Office Action for U.S. Appl. No. 12/861,612, mailed Jun. 11, 2013, 12 pgs.
Notice of Allowance for U.S. Appl. No. 13/091,877, mailed Jun. 11, 2013, 7 pgs.
Notice of Allowance for U.S. Appl. No. 11/801,809, mailed Jun. 20, 2013, 4 pgs.
International Preliminary Report on Patentability (Ch. I) for International Application No. PCT/US2009/032402, issued on Aug. 3, 2010, 7 pgs.
International Preliminary Report on Patentability (Ch. I) for International Application No. PCT/US2009/032390, issued on Aug. 10, 2010, 7 pgs.
Notice of Allowance for U.S. Appl. No. 13/091,877, mailed Oct. 8, 2013, 5 pgs.
Notice of Allowance for U.S. Appl. No. 13/430,429, mailed Oct. 30, 2013, 3 pgs.
Notice of Allowance for U.S. Appl. No. 13/459,720, mailed Oct. 30, 2013, 3 pgs.
Notice of Allowance for U.S. Appl. No. 12/861,612, mailed Sep. 30, 2013, 12 pgs.

* cited by examiner

SYSTEM AND METHOD FOR ARCHIVE VERIFICATION

TECHNICAL FIELD OF THE INVENTION

This disclosure describes various methods and systems for archive verification. More particularly, embodiments of the disclosure include methods and systems for verifying the readability of library media and data stored on library media.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage. In one embodiment, the plurality of media may comprise multiple magnetic tapes. Centralized data backup has the advantage of increased volume, efficiency and redundancy.

In many systems, the data to be backed up and backup commands are sent over a network from multiple machines on the network to a library. In many instances, the data to be backed up and the backup commands are routed to the library through a switch.

One example of a library commonly used in enterprise backup systems is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When specific data is required, a host device determines which cartridge slot contains the tape cartridge that holds the desired data. The host device then transmits a move-element command to the robot and the robot moves the tape cartridge to a tape drive which reads the desired data from the tape cartridge.

In a SCSI tape library, devices that are part of the library are typically addressed by target number. Thus, each drive and robot of a tape library typically has a target number. Cartridge slots, on the other hand, are addressed by element numbers that are used by the robot to locate the slots. Because the robot also places tape cartridges in the drives, each drive is also associated with an element number.

Components of a library are subject to wear and other forms of degradation. The degradation of library components can deleteriously affect the reliability of the library. For example, degrading tape cartridges may exhibit an increasing number of soft errors resulting from corrupted media sections, lost or incorrect data, bit flips, damaged or strained tape sections or other problems or issues. The degradation of a tape cartridge or other media can culminate in the failure of that tape cartridge or media. For example, a tape cartridge or sections of media may be completely unreadable, thus a hard error or errors may occur.

SUMMARY

Embodiments provide systems and methods for archive verification of media in a library. A method of archive verification may include loading a specified media into a drive at intervals, sending one or more commands to the drive in response to which the drive attempts to read the specified media or data on the specified media, collecting data associated with the specified media from the drive and determining the readability of the specified media or data on the specified media.

Embodiments of methods and systems for archive verification of media contained in a library can include a system comprising a controller and a set of computer instructions executable by the controller to implement the above-described method. In a further embodiment, computer readable media may contain computer instructions operable to implement the above-described method.

Embodiments of methods and systems described above allow the readability of media in a library to be monitored such that the degradation of media in a library can be detected. Data on degraded media may be transferred to a different media and the degraded media replaced, preventing the loss of data.

BRIEF DESCRIPTION OF THE FIGURES

A more complete understanding of embodiments of systems and methods and the advantages thereof may be acquired by referring to the following description, taken in conjunction with the accompanying drawings in which like reference numbers indicate like features and wherein.

DETAILED DESCRIPTION

Preferred embodiments are illustrated in the FIGURES, like numerals being used to refer to like and corresponding parts of the various drawings.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments provide a system and method for archive verification. Archive verification allows the degradation of media in a library to be monitored such that degraded media may be replaced or removed from the library and data on degraded media to be transferred before it is damaged, corrupted or lost. Archive verification can comprise loading media into a drive and reading data from the media to verify that the media and data on the media can be read. In one embodiment, media can be loaded into a drive and read according to a verification policy. For example, tape media may be placed in a drive and read every 90 days. As part of verifying that media and data on media can be read, read errors or other verification data associated with library media can be monitored. By monitoring library media in this fashion, the degradation and reliability of library media can be monitored, allowing unreliable or unacceptably degraded media to be identified, thus allowing for data on the unreliable or degraded media to be transferred or otherwise backed up and the degraded media replaced, enhancing the reliability of the library and proactively preventing data loss.

Figure 1:
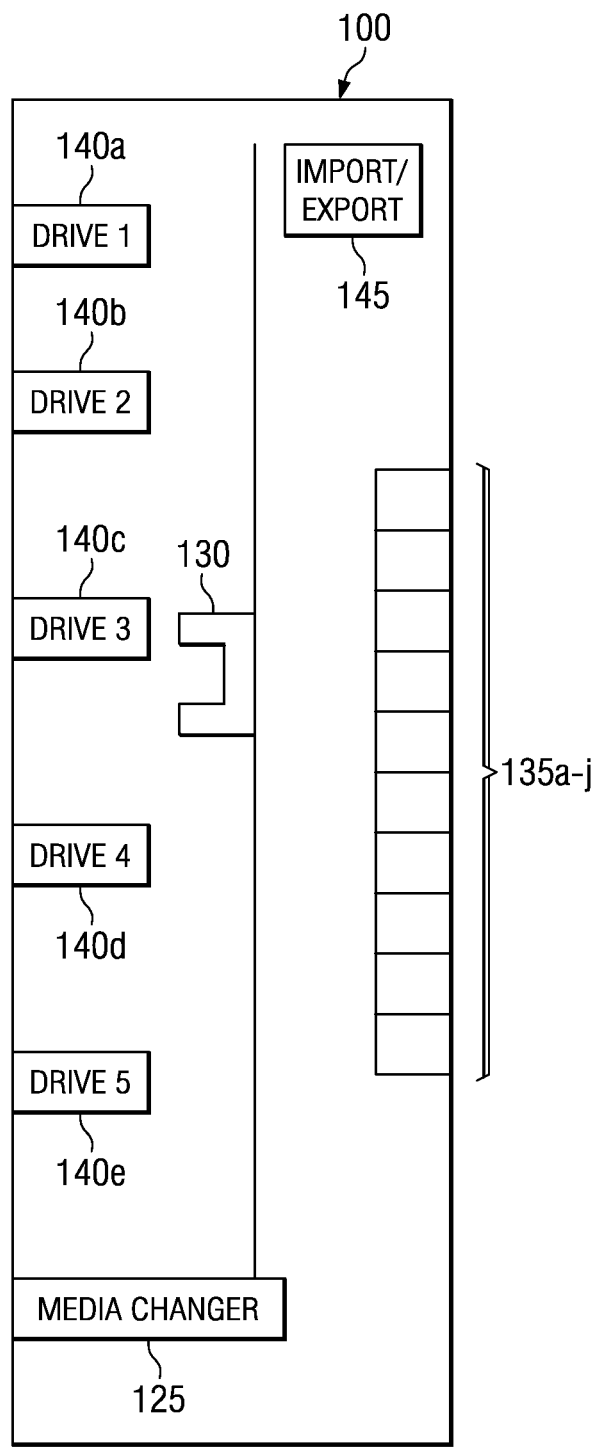
FIG. 1 is a diagrammatic representation of one embodiment of a library.

FIG. 1 is a diagrammatic representation of one embodiment of a tape library, as would be understood by one of ordinary skill in the art. Library 100 can comprise drives 140a-140e, media changer 125 and associated robot 130, import/export element(s) 145 and slots 135a-135j. Drives 140a-140e can read/write data from/to magnetic tape (contained within cartridges), eject tape cartridges and perform other operations. Slots 135a-135j store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be read from the tape cartridge. It should be noted that some libraries may employ a single robot or multiple robots in an expandable or modular configuration.

Library media, such as, for example, backup media such as tape cartridges, backup hard drives or any other media, may contain a flash or other memory in which data may be recorded. This flash memory may be disparate from the memory used as storage for data sent over a network for storage at the library. One term for such flash memory is Medium Auxiliary Memory (MAM) and data stored in MAM may be referred to as MAM data. MAM data for a cartridge may regard the cartridge itself, such as the amount of data read from the cartridge, the size of the cartridge, the load count of the cartridge, etc. In general, MAM has three sections: a medium section containing data written by the manufacturer, a device section containing data written by one or more devices, such as, for example, drives, and a host section containing data written by applications such as, for example, backup applications.

The medium section may contain data from the manufacturer such as the size of the cartridge, the date of manufacture, compatibility information or other data. The device section may contain data from devices which have accessed the cartridge. For example, the device section may contain a load count counter which may be incremented by drives which have loaded the cartridge, read or write error counts, the amount of data read or written, the amount of data contained in the cartridge or other data. The host section may contain data from applications, such as, for example, backup or other applications, which have accessed the cartridge, such data may regard, for example, the type of backup data stored on the cartridge, the backup date or other data. MAM data may be accessed by a Read Attribute command: in response to a Read Attribute command, a drive or other library device may read MAM data and return MAM data to a requesting device. Examples of a Read Attribute command can be found in "SCSI Primary Commands—4 (SPC-4)", (Project T10/1731-D), Revision 2, 15 Sep. 2005, propagated by the T10 Technical Committee of the InterNational Committee on Information Technology Standards (INCITS), which is hereby incorporated by reference.

A Verify command is a command which can be used to verify the readability of tape cartridges (or other library media such as laser discs, hard drives or any other media) and data stored on tape cartridges. A verifying device, which may be, for example, a controller, sends a Verify command to a drive and in response, the drive determines if the cartridge can be read by attempting to read the cartridge. If the drive is able to read the cartridge, the drive returns an indication that the cartridge was successfully read (in one embodiment for example, by returning a command complete to the verifying device). If the drive is unable to read the cartridge, the drive may return an indication that the cartridge could not be read. The inability to read a cartridge or data on a cartridge may be the result of a hard error or the failure of the Verify command. Thus, a Verify command can be used to verify that a particular cartridge in a library can be read. Examples of a Verify command can be found in "SCSI Block Commands—3 (SBC-3)", (Project T10/1799-D), Revision 6, 24 Jul. 2006, propagated by the T10 Technical Committee of the InterNational Committee on Information Technology Standards (INCITS), which is hereby incorporated by reference.

A Read command is a command which can be used to read tape cartridges (or other library media such as laser discs, hard drives or any other media). That is, a requesting device sends a Read command to a drive and in response, the drive reads data stored on the cartridge and the read data is returned to the requesting device. Thus a Read command can be used to retrieve data from a tape cartridge in a drive.

As part of the process of retrieving data, it can be verified that a particular cartridge and data on the particular cartridge can be read. For example, if a Read command is sent to a drive and data from a particular cartridge is successfully read, that particular cartridge and data on that particular cartridge can be read. On the other hand, if that particular cartridge or data from that particular cartridge cannot be read, then the cartridge has degraded. The inability to read a cartridge or data from a cartridge may be the result of a hard error or a failure of the Read command. Thus, a verifying device can use a Read command to verify the readability of cartridges and data on cartridges. For example, a verifying device can send a Read command to a drive and if data is returned, the readability of the particular cartridge read is verified. On the other hand, if one or more read errors is returned or if data cannot be read from that particular cartridge, the particular cartridge may be degraded. Examples of a Read command can be found in "SCSI Block Commands—3 (SBC-3)", (Project T10/1799-D), Revision 6, 24 Jul. 2006, propagated by the T10 Technical Committee of the InterNational Committee on Information Technology Standards (INCITS), which is hereby incorporated by reference.

A Log Sense (LS) command is a command which is used to obtain data associated with a particular drive. A LS command is sent to a particular drive of a library and in response, the particular drive returns data associated with the drive and cartridges accessed by the drive. For example, such data might include: read errors, write errors, utilization and performance data, data regarding the data written and read to a media, media loaded, detail tables or other data. Examples of a LS command can be found in "SCSI Primary Commands—4 (SPC-4)", (Project T10/1731-D), Revision 10, 21 Apr. 2007, propagated by the T10 Technical Committee of the InterNational Committee on Information Technology Standards (INCITS), which is hereby incorporated by reference.

Figure 5:
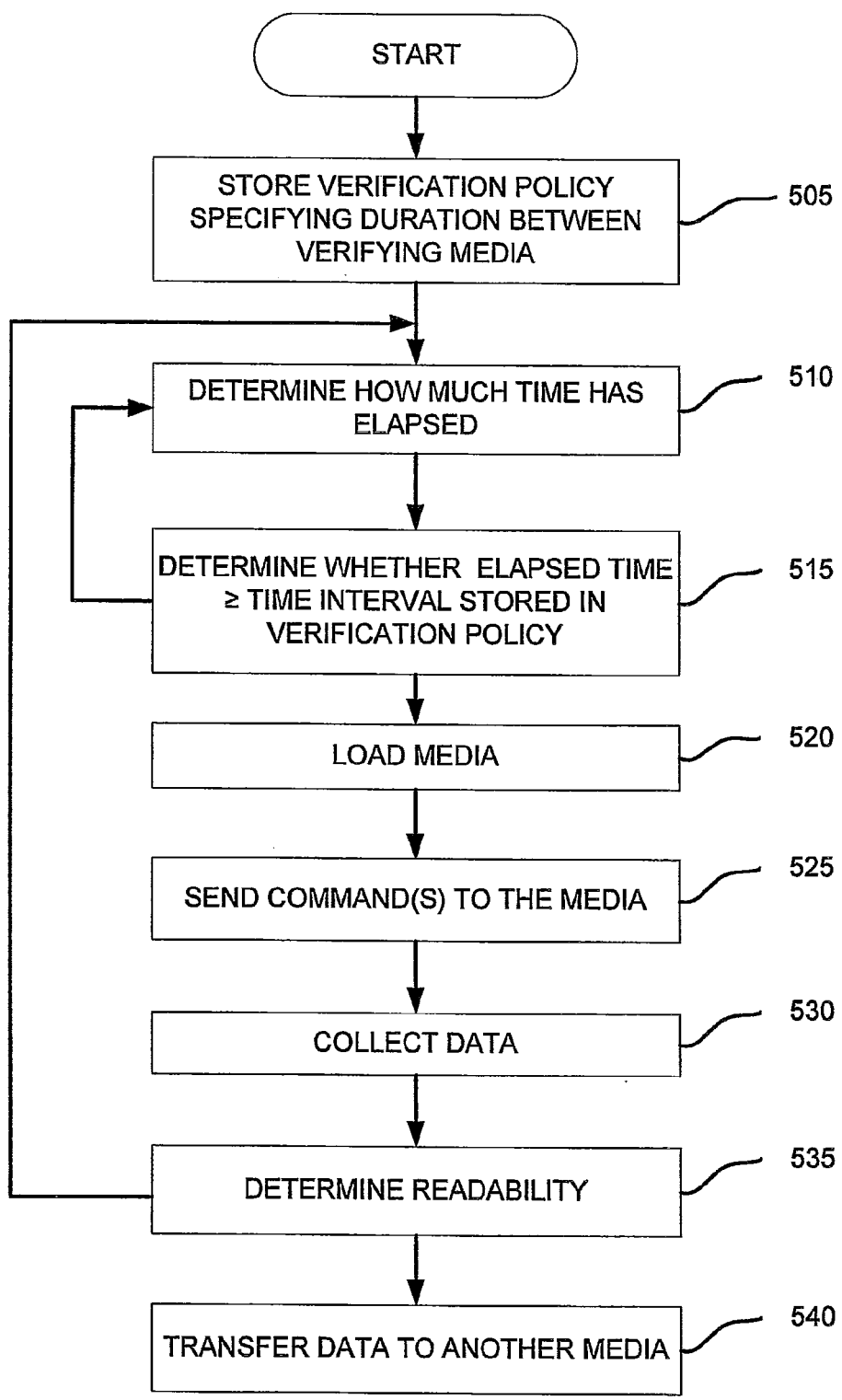
FIG. 5 is a flowchart illustrating a method for monitoring library components according to one embodiment.

An archive verification engine can provide archive verification for one or more libraries. In an embodiment, an archive verification engine can be a component of a monitoring appliance which can be a Read Verify Appliance (RVA). In one embodiment, the archive verification engine is a set of computer instructions which can be executed by a monitoring appliance controller to verify library media. The archive verification engine can further be associated with or comprise a verification policy. The verification policy can specify archive verification parameters such as the duration between verifying cartridges, the acceptable number of read errors or other parameters. In one embodiment, the verification policy is stored at the monitoring appliance. See, e.g., step 505 of FIG. 5.

In one embodiment, a monitoring appliance verifies cartridges (or other media) in a library according to a verification policy. In one example, the verification policy may stipulate that individual cartridges are to be verified periodically, such as every 90 days. See, e.g., step 510 of FIG. 5. Thus, as stipulated by the verification policy, the monitoring appliance may verify cartridges every 90 days. The monitoring appliance may keep track of how much time has elapsed since cartridges in a library have been verified and if the monitoring appliance determines that 90 days have elapsed since a particular cartridge was last verified, the monitoring appliance may verify that particular cartridge. See, e.g., step 515 of FIG. 5. Reading data on a cartridge causes cartridge wear, thus a period between verifications may be chosen which minimizes wear while allowing for satisfactory verification of media. One such period may be 90 days, but other periods may be chosen. Periods between verification may be the same for all media in a library or may be different for one or more media or classes of media. For example, older tape cartridges may be verified more often than newer tape cartridges.

In one embodiment, the monitoring appliance is able to determine the time elapsed since a particular cartridge was verified because the monitoring appliance queries the state of the library over time and uses data regarding the state of the library to track cartridges and the operations associated with the cartridge. See, e.g., step 510 of FIG. 5. Tracking cartridges and maintaining information regarding cartridges is described in U.S. patent application Ser. No. 11/801,809, entitled "METHOD AND SYSTEM FOR NON-INTRUSIVE MONITORING OF LIBRARY COMPONENTS," and U.S. patent application Ser. No. 12/024,755, entitled "MEDIA LIBRARY MONITORING SYSYEM AND METHOD," issued as U.S. Pat. No. 7,908,366, both of which are hereby incorporated by reference. In another embodiment, all cartridges in a library or a known subset of cartridges in a library are verified periodically. For example, a periodic verification window can be allocated for periodic archive verification and all cartridges in a library or a known subset of cartridges can be verified during the verification window. Such verification may utilize all or most of the drives in a library. Because all cartridges in a library or a known subset of cartridges in a library are verified, the monitoring appliance can verify cartridges based on an internal clock or other timing device.

Figure 2A:
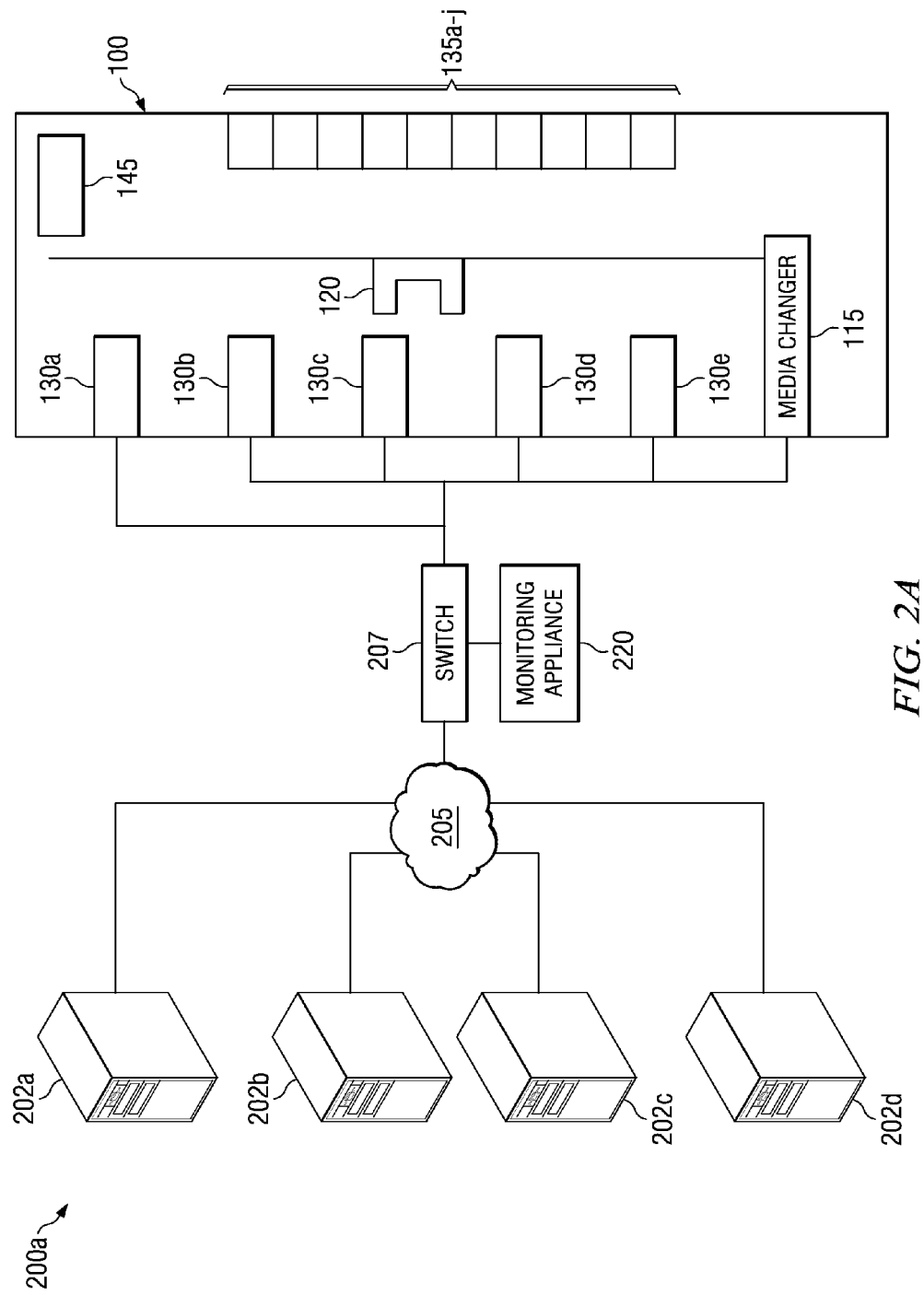
FIG. 2A-2C are diagrammatic representations of embodiments of a system utilizing a library and having a monitoring appliance.

FIG. 2A is a diagrammatic representation of a system 200a in which a plurality of hosts 202a-202d have access to library 100 over network 205. Network 205 can comprise the Internet, a SAN, a LAN, a WAN, a wireless network or any other communications network known in the art. Hosts 202a-202d are coupled to library 100 via network 205 and switch 207. Similarly, library 100 can communicate with switch 207 over any suitable communications link or network known in the art and can use additional protocols such as iSCSI, TCP/IP, or other protocol known in the art. Switch 207 is connected to monitoring appliance 220.

Switch 207 is connected to library 100. Thus switch 207 can forward Verify, Read, LS or Read Attribute commands from monitoring appliance 220 to library 100. Switch 207 receives the verification data generated in response to the commands from library 100 and forwards the verification data to monitoring appliance 220 which may compare the verification data against requirements contained in a verification policy and may store the verification data in a repository. By comparing the verification data against requirements of a verification policy and by comparing verification data against previous verification data regarding a particular cartridge stored in a repository, monitoring device 220 can monitor the degradation of cartridges. Because monitoring appliance 220 verifies cartridges by sending commands to a library or library devices such as drives or other devices, monitoring appliance 220 does not need to intercept commands or responses from network 205 to verify cartridges. Thus, in one embodiment, monitoring appliance 220 can be an out-of-band appliance. This allows monitoring appliance 220 to be a non-intrusive device which does not monitor or interfere with commands from and responses to hosts 202a-202d. Consequently, monitoring appliance 220 can be a compartmentalized device which can be coupled to a switch.

Figure 2B:
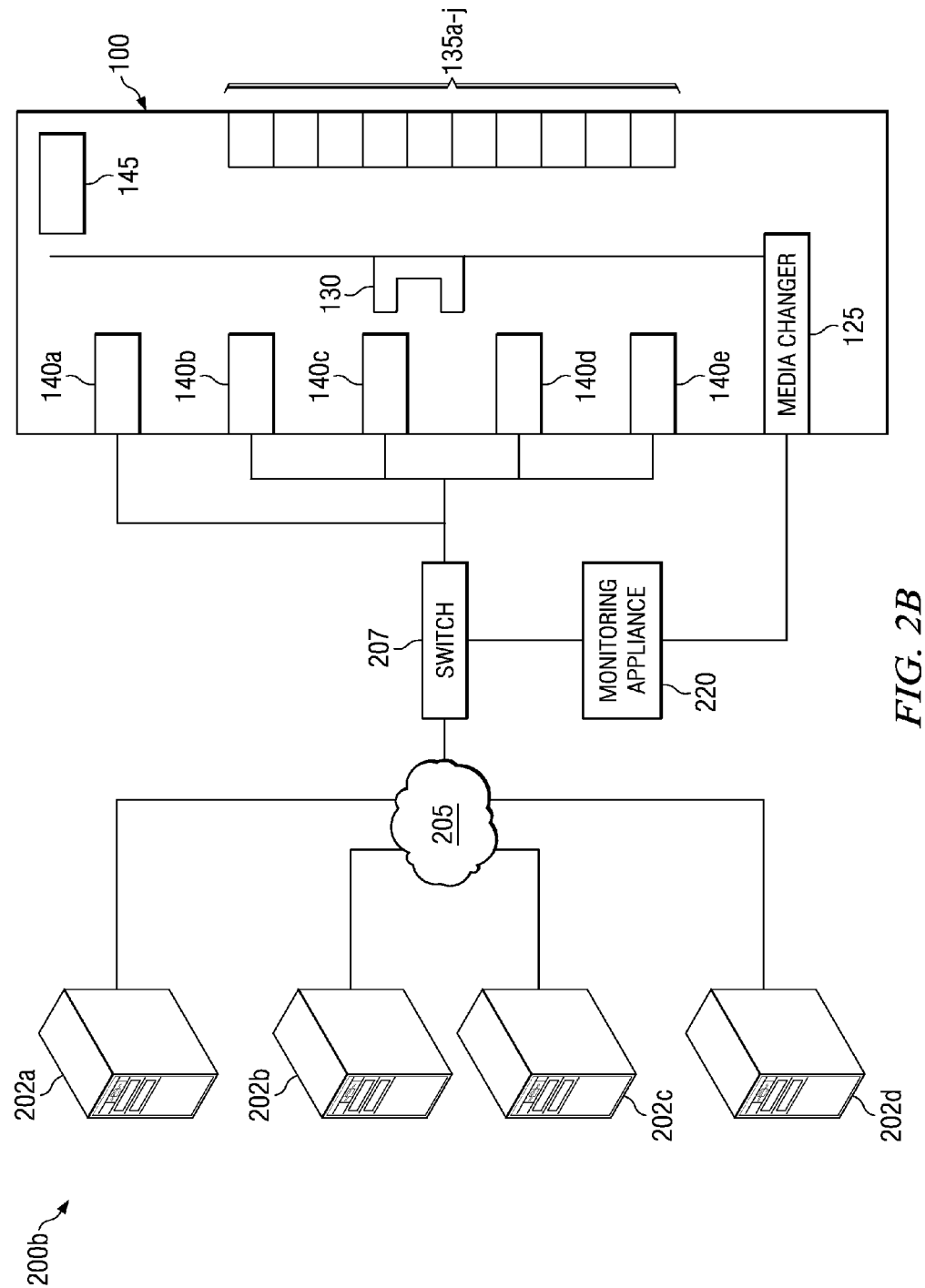
Figure 2C:
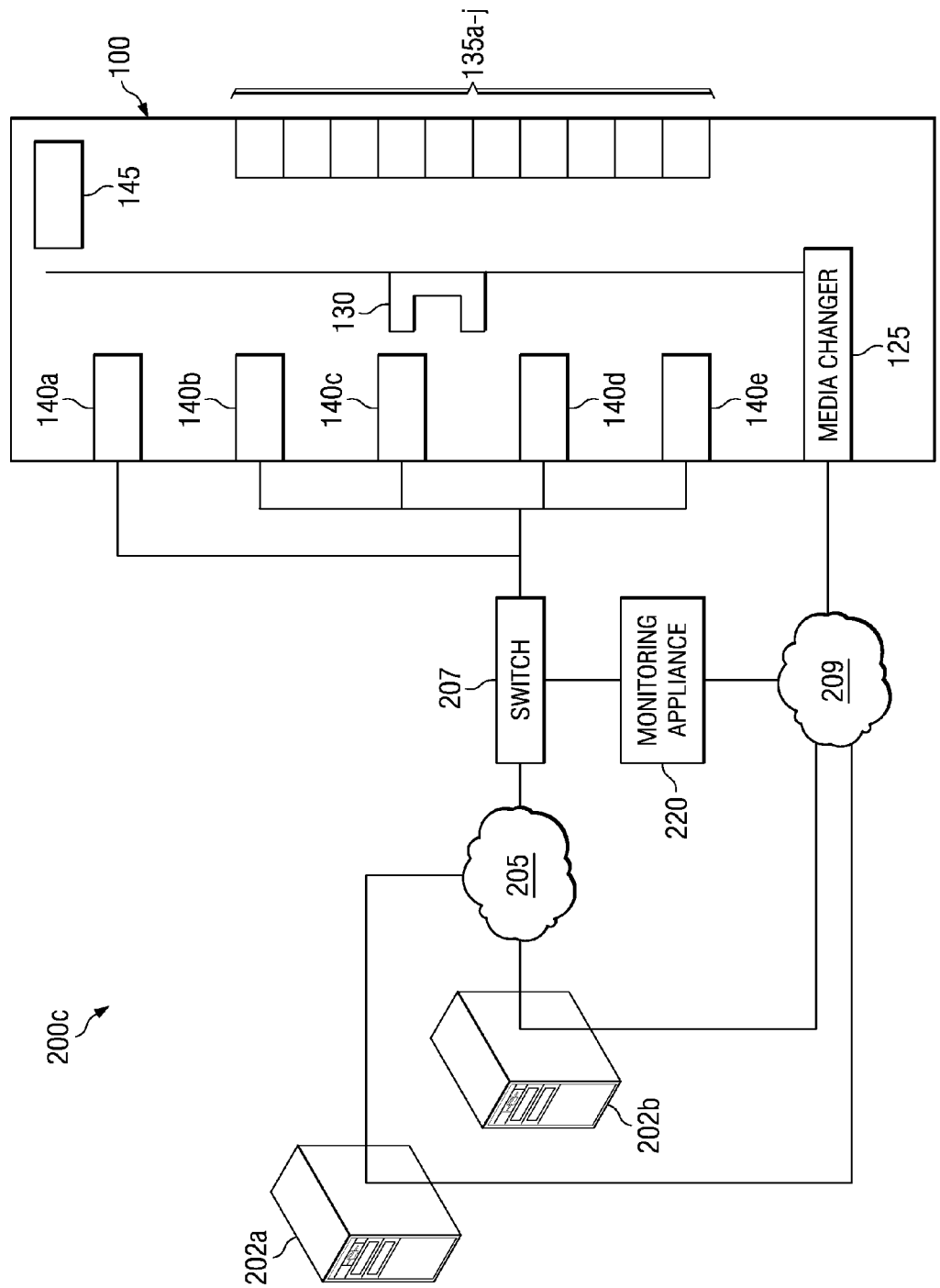

While a particular network topology is shown in FIG. 2A, a monitoring appliance may be used in other network topologies to collect data associated with a library or library components. FIGS. 2B and 2C are diagrammatic representations of example network topologies in which a monitoring appliance can be used to collect data associated with a library or components of the library.

For example, FIG. 2B is a diagrammatic representation of a system 200b having a network topology in which monitoring appliance 220 is coupled to media changer 125 and coupled to drives 140a-140e through switch 207. Thus, monitoring appliance 220 can communicate with (in one embodiment, for example, by sending commands to or receiving data from) media changer 125 and drives 140a-140e. By way of further example, FIG. 2C is a diagrammatic representation of a system 200c having a network topology in which monitoring appliance 220 is coupled to drives 140a-140e through switch 207 and is coupled to media changer 125 through network 209. Thus, monitoring appliance 220 can communicate with media changer 125 and drives 140a-140e. In system 200c, networks 205 and 209 can be different types of networks. For example, network 205 might be a fibre channel network whereas network 209 might be a IP network.

While shown as a physical media library in FIG. 2A-2C, library 100 can be a virtual media library that is a virtual representation of one or more physical media libraries as presented by switch 207, a library controller or other component. Examples of library virtualization are described in U.S. patent application Ser. No. 10/704,265, entitled SYSTEM AND METHOD FOR CONTROLLING ACCESS TO MULTIPLE PHYSICAL MEDIA LIBRARIES, and U.S. patent application Ser. No. 10/703,965, entitled SYSTEM AND METHOD FOR CONTROLLING ACCESS TO MEDIA LIBRARIES, both of which are hereby incorporated by reference herein.

To verify a particular cartridge in a library, the monitoring appliance (for example, monitoring appliance 220 of FIGS. 2A-2C) requests that library 100 load the cartridge to be verified in one of drives 140a-140e, and sends a Verify command to the drive. See, e.g., steps 520, 525 and 530 of FIG. 5. A particular drive may be reserved for all verification operations. In response, library 100 loads the particular cartridge into a drive and the drive attempts to read data stored on the cartridge. In the course of reading data or attempting to read data on the cartridge, the drive may register read errors. Registering read errors increments a read error counter within the drive. Such a read error counter may be a buffer or other memory which is incremented when the drive registers a read error in the course of reading or attempting to read a cartridge. Read errors may be soft errors or hard errors. Soft errors may include flipped bits, corrupted data, damaged media sectors or other problems or issues. Read errors may also be hard errors indicating cartridge failure or damaged media sections. In one embodiment, the read error counter logs soft errors and hard errors in separate sections in the read error counter.

If the drive is able to read data stored on the cartridge and so verify the readability of the cartridge, the drive returns an indication of a successful verification to monitoring appliance 220. See, e.g., steps 530 and 535 of FIG. 5. Such an indication may be, for example, a command complete message. If, however, the drive is unable to read data stored on the cartridge or the cartridge, the drive may return an indication of a failed verification to monitoring appliance 220. See, e.g., step 530 of FIG. 5. The inability to read a cartridge may be the result of a hard error or the failure of a command.

In addition to sending a Verify command to library 100, monitoring appliance 220 may send a LS command to the drive in which the particular cartridge was loaded. In response to the LS command, the drive returns data associated with the drive being verified. Such data may include the number of read errors logged by the drive and may also include: utilization and performance data, data regarding the data read from the media, detail tables or other data. In one embodiment, data returned in response to a LS command or other command may be used to determine which sections of the media registered soft errors or could not be read by, for example, tracking the count of blocks. Such functionality may be implemented at the monitoring appliance or other device.

To verify one or more cartridges, monitoring appliance 220 may also utilize a Read command in much the same way that the Verify command was utilized as described above. See, e.g., step 525 of FIG. 5. The drive will, however, return the data read from the cartridge. See, e.g., step 530 of FIG. 5. Receiving read data from a drive serves to confirm that the drive is able to read a cartridge and data on a cartridge. Furthermore, it is possible to compare checksums against the data returned to ensure that the read data is correct. Other data verification algorithms may be performed on the returned data.

To verify the particular cartridge, a Read Attribute command may also be issued the drive. See, e.g., step 525 of FIG. 5. In response to the Read Attribute command, the drive returns MAM data from the particular cartridge in the drive.

Based on the verification data (which may be, for example, data used to determine the reliability of media, such as data returned in response to a Verify command, Read command, LS command, Read Attribute command) returned from the drive monitoring appliance 220 can verify if the particular cartridge can be read and sections of the cartridge that can or cannot be read. See, e.g., step 535 of FIG. 5. According to one embodiment, in the context of monitoring appliance 220, a subroutine running on a controller in monitoring appliance 220 can correlate data returned in response to an LS command (i.e. the number of read errors registered by the drive) with the cartridge such that the number of read errors (for example, soft errors or hard errors) registered by a drive while reading or attempting to read a particular cartridge can be correlated with that particular cartridge. In one embodiment, because a monitoring appliance 220 can track which cartridge is in a drive when it issues a Verify command, a Read command, a LS command or other command, a subroutine running on the monitoring appliance can correlate the data received in response to the various commands to the particular cartridge.

Monitoring appliance 220 can further save verification data over time in a data repository which may be part of or extend to monitoring appliance 220. If the verification data for a particular cartridge exhibits an upward trend in read errors over time or if read errors are increasingly prevalent in a particular section of the cartridge, based on replacement rules in the verification policy, monitoring device 220 may issue a warning to a user (virtual or otherwise) that the cartridge has degraded such that it is no longer reliable and that data on the cartridge should be transferred before it is corrupted or lost. Alternatively, monitoring appliance 220 may automatically begin a data transfer from a tape showing decreased reliability to another tape.

Figure 3:
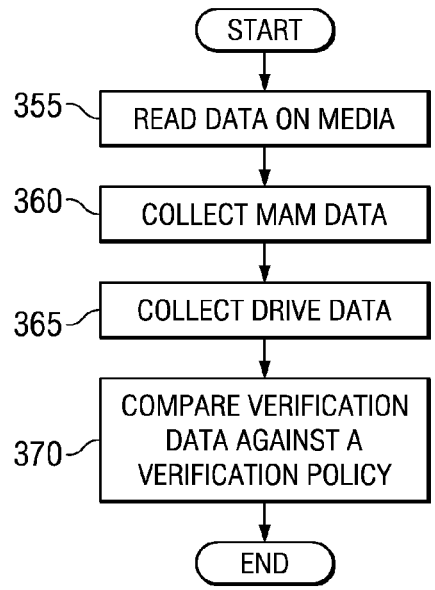
FIG. 3 is a flowchart illustrating a method for monitoring library components according to one embodiment.

FIG. 3 is a flow chart illustrating one embodiment of a method for archive verification. According to one embodiment, the method of FIG. 3 can be implemented as a set of computer executable instructions stored on a computer readable medium at, for example, monitoring appliance 220. The set of computer executable instructions can, when executed, verify library media in a non-intrusive manner. At step 355, monitoring appliance 220 instructs a library to load a cartridge to be verified in a drive and issues a Verify command or Read command to the drive. The library loads the particular cartridge into a drive and the drive attempts to read data on the cartridge. If a Verify command is sent to the drive, verification data indicating whether the cartridge or data on the cartridge can be read is returned (such as, for example, a command complete or a read failure indication or equivalent). Such verification data may further include data associated with reading the cartridge. If a Read command is sent, and data stored on the cartridge is successfully read, data from the particular cartridge may be returned. If the cartridge or data on the cartridge is not successfully read, verification data indicating that data or the cartridge cannot be read is returned.

At step 360, MAM data on the particular cartridge is collected by sending a Read Attribute command to the drive in which the particular cartridge is located. See, e.g., step 530 of FIG. 5. In response, the drive reads the MAM data from the MAM (which may be, in one embodiment, flash or other memory) on the particular cartridge and the drive returns the MAM data. At step 365, drive data from the drive which read the particular cartridge is collected by sending an LS command to the drive. In response, the drive returns drive data associated with the particular cartridge. Such data may include read errors (which may include, for example, the number of soft errors logged by the drive or hard errors) associated with a particular cartridge, utilization and performance data, data regarding the data read from the particular cartridge, detail tables or other data.

As part of steps 355, 360 or 365, data returned from the drive may be stored in a repository located at, for example, monitoring appliance 220. Collected data may also be correlated with cartridges. For example, data returned in response to a LS command may be correlated to the corresponding cartridge.

At step 370, verification data is compared against a verification policy. Based on the comparison of the verification data against the verification policy, it can be determined if the particular cartridge is unacceptably degraded and requires replacement. For example, if the verification policy specifies an upper-bound read error threshold and the number of read errors listed in returned verification data corresponding to a particular cartridge exceeds the read error threshold, the verification policy may require that the data on the particular cartridge be transferred and the cartridge replaced or removed from the library. See, step 540 of FIG. 5.

In other cases, the comparison may include a statistical analysis of the verification data and comparing the results of such analysis to the verification policies. For example, statistical analysis or other forms of mathematical analysis can be applied to verification data regarding read errors and corresponding to particular cartridges. Based on the statistical analysis, which may be done in accordance with a verification policy, the degradation of a cartridge may be determined and the cartridge may be retired and data on the cartridge transferred.

In one embodiment, if a Read command is used to read data, the data returned as part of a successful read can be compared against the data written to the cartridge. For example, when data is written to a cartridge, redundancy check data (for example, a cyclic redundancy check, checksum or other redundancy check) can be generated using the data written to the cartridge and the redundancy check data stored. When data returned as part of a successful read is returned to the monitoring appliance, redundancy check data may be generated from the received data and a redundancy check can be performed against the redundancy check data generated when data was written. In one embodiment, the redundancy check can be utilized to identify soft errors caused by, for example, corrupted data.

To achieve archive verification, a specific drive of a library may be dedicated to archive verification such that the drive is generally only used for archive verification. In other embodiments, to minimize possible conflicts between archive verification and other operations performed by a library, drives may be dedicated to archive verification for periods of time (for example, a verification window). For example, a specific drive may be dedicated to archive verification for a two hour verification window on certain days. In a further embodiment, all the drives in a library are dedicated to archive verification during a periodic verification window. For example, all the drives in a library may dedicated to archive verification during a verification window that repeats monthly.

Figure 4:
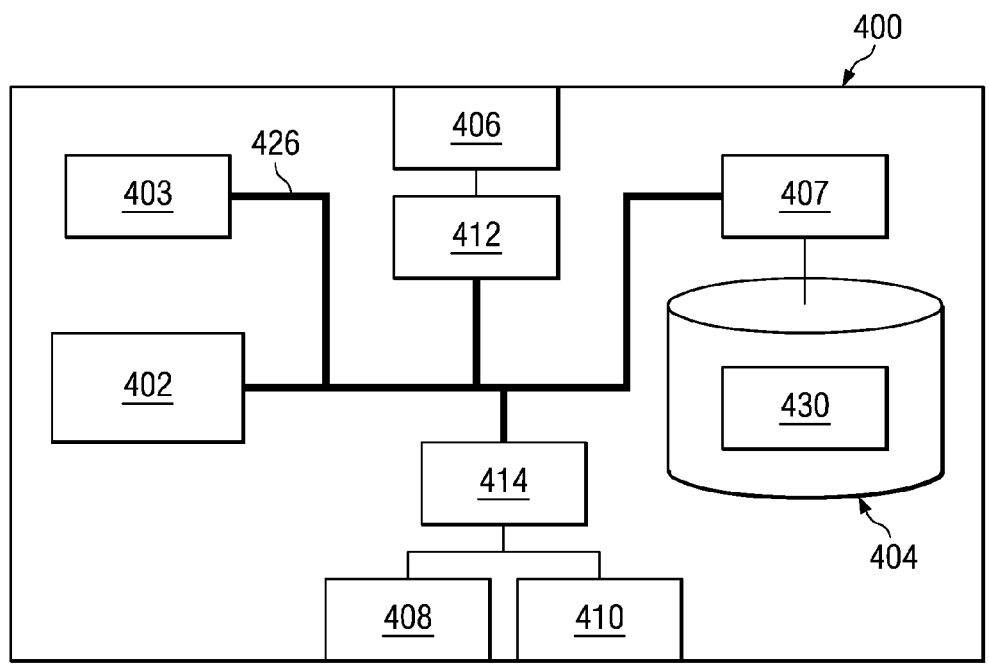
FIG. 4 is a diagrammatic representation of one embodiment of a controller which can be used in a monitoring appliance.

FIG. 4 is a diagrammatic representation of a monitoring appliance controller 400 ("controller 400"). Controller can include a processor 402, such as an Intel Pentium 4 based processor (Intel and Pentium are trademarks of Intel Corporation of Santa Clara, Calif.), a primary memory 403 (which, in one embodiment, may comprise RAM, ROM, Flash Memory, EEPROM or other computer readable medium known in the art) and a secondary memory 404 (which, in one embodiment may comprise a hard drive, disk drive, optical drive or other computer readable medium known in the art). A memory controller 407 can control access to secondary memory 404. Controller 400 can comprise a communications interface 406 (which, in one embodiment, may comprise fibre channel interface, Ethernet port or other communications interface known in the art) to connect controller 400 to a switch or other network interface such as, for example, switch 207 of FIGS. 2A-2C. An I/O controller 412 can control interactions with the switch. Similarly, an I/O controller 414 can control interactions over I/O interfaces 408 and 410. Controller 400 can include a variety of input devices. Various components of controller 400 can be connected by a bus 426.

Secondary memory 404 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 404 can store a software program 430 that comprises an archive verification engine. Secondary memory 404 can also store a verification policy which may be part of software program 430. Secondary memory 404 can also serve as a repository for verification data which may be saved over time. During execution by processor 402, portions of program 430 can be stored in secondary memory 404 and/or primary memory 403.

Verification data can be stored and used to monitor the degradation of cartridges or other media in a library. Verification data can be stored in memory, in a database or according to other data storage schemes to allow for easy access.

Embodiments can also be implemented with respect to libraries of media other than magnetic tapes. For example, the library can comprise a plurality of optical disks (i.e., an optical jukebox) or removable hard drives. Other libraries which may be verified according to embodiments of above described systems and methods can utilize a combination of different storage media such as hard drives, magnetic media or optical media.

While embodiments have been described with particularity, it should be understood that the embodiments are illustrative and that the scope of the invention is not limited to these embodiments. For example, while the above described systems and methods have been described in the context of a monitoring appliance and utilizing a monitoring appliance for archive verification, computer instructions implementing embodiments of the above described methods can be run on one or more hosts connected to a library over a network to achieve archive verification. For example, a host may send commands over a network to a host and receive returned verification data over the network. By way of further example, while embodiments disclosed above have been disclosed with regard to Read Attribute commands, Verify commands, Read commands and LS commands, other commands may be used for archive verification. Many other variations, modifications, additions and improvements to the embodiments described above are possible. It is contemplated that these variations, modifications, additions and improvements fall within the scope of the invention as detailed in the following claims.

What is claimed is:

1. An appliance for archive verification, comprising:
a network interface operable to interface with a network and receive data from the network;
a processor coupled to the network interface; and
a computer readable media storing computer instructions executable by the processor to:
store a verification policy specifying archive verification parameters, wherein at least one archive verification parameter specifies an interval of time between verifying a media in a media library;

periodically determine how much time has elapsed since a specified media in the media library has been verified;

compare the elapsed time to the interval of time specified by the verification policy;

determine whether the elapsed time is equal to or greater than the interval of time specified by the verification policy;

load the specified media into a drive of the media library based on a determination that the elapsed time is equal to or greater than the interval of time specified by the verification policy;

send a first set of one or more commands to the drive to instruct the drive to read the specified media in accordance with the one or more commands;

send a second set of one or more commands to the drive to collect error data logged by the drive when reading the specified media, the error data comprising an indication of read errors logged by the drive;

receive the error data from the drive and associate the error data with the specified media; and apply one or more rules specified in the verification policy to the error data to determine readability of data previously backed up on the specified media, wherein applying the one or more rules specified in the verification policy to the error data to determine the readability of the specified media comprises comparing a number of read errors to a threshold specified in the verification policy.

2. The appliance of claim 1, wherein the specified media is a tape cartridge.

3. The appliance of claim 1, wherein sending the first set of one or more commands to the drive comprises sending a Read command to the drive and wherein the computer instructions further comprise instruction executable to send a Read Attribute command to the drive to request data stored in a medium auxiliary memory of the specified media.

4. The appliance of claim 1, wherein sending the first set of one or more commands to the drive comprises sending a Verify command to the drive and wherein the computer instructions further comprise instruction executable to send a Read Attribute command to the drive to request data stored in a medium auxiliary memory of the specified media.

5. The appliance of claim 1, wherein sending the second set of one or more commands comprises sending a LS command to the drive to request a log page containing the error data.

6. The appliance of claim 1, wherein the drive is dedicated to archive verification.

7. A method of archive verification, comprising:

at an appliance for archive verification, comprising:
a network interface operable to interface with a network and receive data from the network;
a processor coupled to the network interface; and
a computer readable media storing computer instructions, wherein the computer instructions are executable by the processor to perform the steps of:

storing a verification policy specifying archive verification parameters, wherein at least one archive verification parameter specifies an interval of time between verifying a media in a media library;

periodically determining how much time has elapsed since a specified media in the media library has been verified;

comparing the elapsed time to the interval of time specified by the verification policy;

determining whether the elapsed time is equal to or greater than the interval of time specified by the verification policy;

loading the specified media into a drive of the media library based on a determination that the elapsed time is equal to or greater than the interval of time specified by the verification policy;

sending a first set of one or more commands to the drive instructing the drive to read the specified media in accordance with the one or more commands;

sending a second set of one or more commands to the drive to collect error data logged by the drive when reading the specified media, the error data comprising an indication of read errors logged by the drive;

receiving the error data from the drive and associating the error data with the specified media; and apply one or more rules specified in the verification policy to the error data to determine the readability of data previously backed up on the specified media, wherein applying the one or more rules specified in the verification policy to the error data to determine the readability of the specified media comprises comparing a number of read errors to a threshold specified in the verification policy.

8. The method of claim 7, wherein the specified media is a tape cartridge.

9. The method of claim 7, wherein sending the first set of one or more commands to the drive comprises sending a Read command to the drive and the method further comprises send a Read Attribute command to the drive to request data stored in a medium auxiliary memory of the specified media.

10. The method of claim 7, wherein sending the first set of one or more commands to the drive comprises sending a Verify command to the drive and the method further comprises send a Read Attribute command to the drive to request data stored in a medium auxiliary memory of the specified media.

11. The method of claim 7, wherein sending the second set of one more commands comprises sending a LS command to the drive to request a log page containing the error date.

12. The method of claim 7, wherein the drive is dedicated to archive verification.

13. The method of claim 7, further comprising:
determining that the specified media is exhibiting decreased reliability; and
issuing an alert based on the decreased reliability.

14. The method of claim 7, further comprising:
determining that the specified media is exhibiting decreased reliability; and
transferring the data from the specified media to a different media based on the decreased reliability.

15. A software product comprising a non-transitory computer readable medium storing a set of computer instructions, the set of computer instructions comprising computer instructions executable to:

store a verification policy specifying archive verification parameters, wherein at least one archive verification parameter specifies an interval of time between verifying a media in a media library;

periodically determine how much time has elapsed since a specified media in the media library has been verified;

compare the elapsed time to the interval of time specified by the verification policy;

determine whether the elapsed time is equal to or greater than the interval of time specified by the verification policy;

load the specified media into a drive of the media library based on a determination that the elapsed time is equal to or greater than the interval of time specified by the verification policy;

send a first set of one or more commands to the drive instructing the drive to read the specified media in accordance with the one or more commands;

send a second set of one or more commands to the drive to collect error data logged by the drive when reading the specified media, the error data comprising an indication of read errors logged by the drive;

receive the error data from the drive and associate the error data with the specified media; and apply one or more rules specified in the verification policy to the error data to determine a readability of data previously backed up on the specified media, wherein applying the one or more rules specified in the verification policy to the error data to determine the readability of the specified media comprises comparing a number of read errors to a threshold specified in the verification policy.

16. The software product of claim 15, wherein the specified media is a tape cartridge.

17. The software product of claim 15, sending the first set of one or more commands to the drive comprises
sending a Verify command to the drive and wherein the computer instructions further comprise instruction executable to send a Read Attribute command to the drive to request data stored in a medium auxiliary memory of the specified media.

18. The software product of claim 15, wherein sending the first set of one or more commands to the drive comprises
sending a Verify command to the drive and wherein the computer instructions further comprise instruction executable to send a Read Attribute command to the drive to request data stored in a medium auxiliary memory of the specified media.

19. The software product of claim 15, wherein sending the second set of one or more commands comprises sending a LS command to the drive to request a log page containing the error data.

20. The software product of claim 15, wherein the drive is dedicated to archive verification.

21. The software product of claim 15, further comprising computer instructions executable to:
determine that the specified media is exhibiting decreased reliability; and
issue an alert based on the decreased reliability.

22. The software product of claim 15, further comprising computer instructions executable to:
determine that the specified media is exhibiting decreased reliability; and
transfer the data from the specified media to a different media based on the decreased reliability.

23. The appliance of claim 1, wherein the verification policy specifies the interval of time based on a media class.

24. The appliance of claim 1, wherein older media are verified more often than newer media.

25. The appliance of claim 1, wherein the computer instructions are further executable by the processor to: compare verification data against previous verification data associated with the specified media to determine a degradation of the specified media.

26. The appliance of claim 1, wherein the computer instructions are further executable by the processor to:
identify a section of the media that could not be read based on the data received from the media library.

27. The appliance of claim 1, wherein the computer instructions are further executable by the processor to:
store verification data in a repository;
analyze the stored verification data to determine whether the specified media exhibits an upward trend in a number of errors; and
determine, based on the analysis, whether the specified media is degraded.

28. The method of claim 7, wherein the verification policy specifies the interval of time based on a media class.

29. The method of claim 7, wherein older media are verified more often than newer media.

30. The method of claim 7, further comprising: comparing verification data against previous verification data associated with the specified media to determine a degradation of the specified media.

31. The method of claim 7, wherein the method further comprises
identifying a section of the media that could not be read based on data received from the media library.

32. The method of claim 7, further comprising:
storing verification data in a repository;
analyzing the stored verification data to determine whether the specified media exhibits an upward trend in a number of errors; and
determining, based on the analysis, whether the specified media is degraded.

33. The software product of claim 15, wherein the verification policy specifies the interval of time based on a media class.

34. The software product of claim 15, wherein older media are verified more often than newer media.

35. The software product of claim 15, wherein the computer instructions are executable to: compare verification data against previous verification data associated with the specified media to determine a degradation of the specified media.

36. The software product of claim 15, wherein the computer instructions are executable to
identify a section of the media that could not be read based on data received from the media library.

37. The software product of claim 15, wherein the computer instructions are executable to:
store verification data in a repository;
analyze the stored verification data to determine whether the specified media exhibits an upward trend in a number of errors; and
determine, based on the analysis, whether the specified media is degraded.

38. The appliance of claim 1, wherein the second set of one or more commands are sent to the drive and the one or more rules applied to the error data even if the drive successfully reads the specified media.

39. The software product of claim 15, wherein the second set of one or more commands are sent to the drive and the one or more rules applied to the error data even if the drive successfully reads the specified media.

40. The method of claim 7, wherein the second set of one or more commands are sent to the drive even and the one or more rules applied to the error data if the drive successfully reads the specified media.

* * * * *